United States Patent Office 2,980,504
Patented Apr. 18, 1961

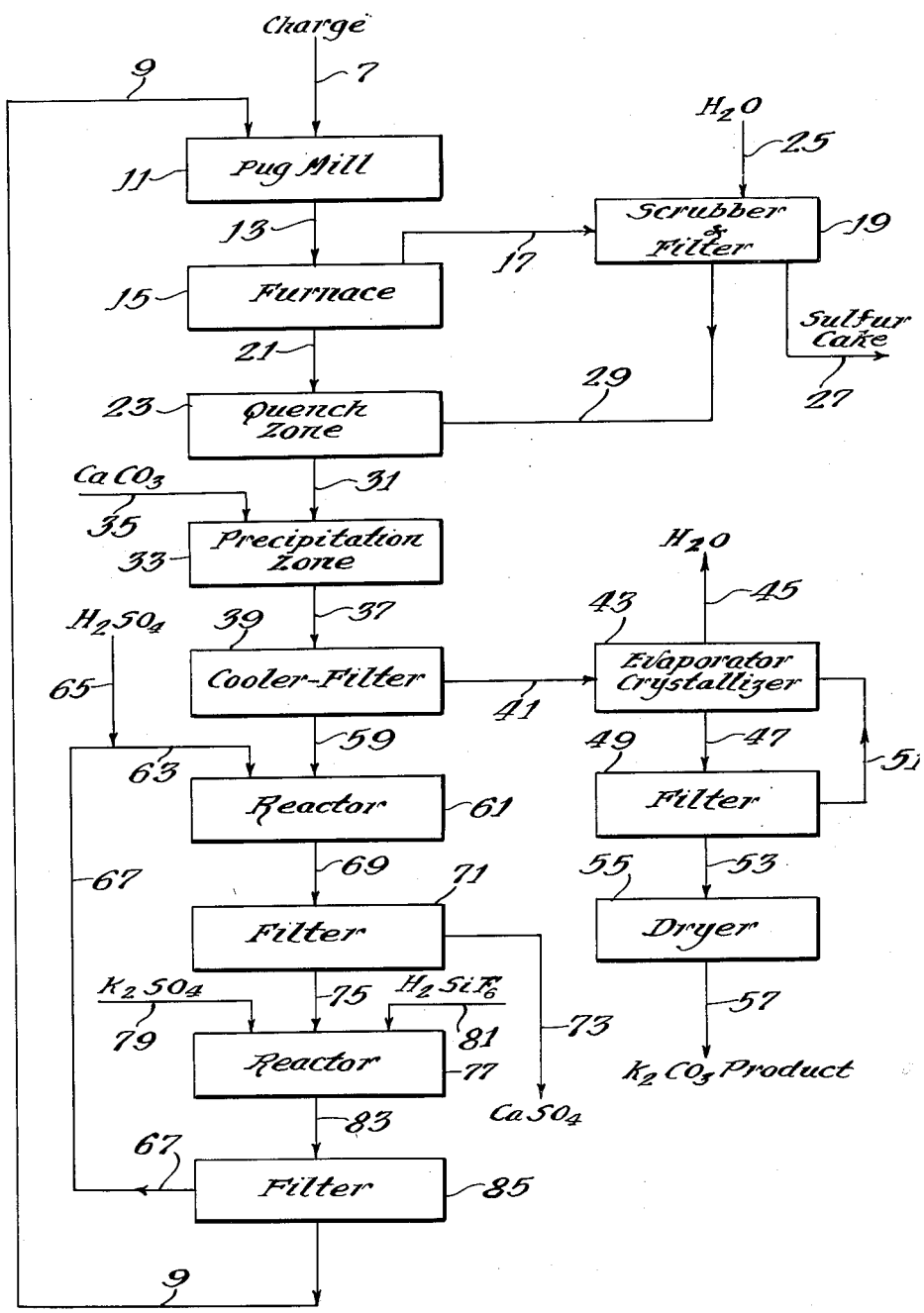

2,980,504
PREPARATION OF POTASSIUM COMPOUNDS FROM POTASSIUM SULFATE

Arthur N. Baumann, Lakeland, Fla., assignor to International Minerals & Chemical Corporation, a corporation of New York Filed Jan. 7, 1959, Ser. No. 785,514

11 Claims. (Cl. 23—63)

The present invention generally relates to a process for the production of potassium compounds from potassium sulfate. The present invention more particularly relates to the preparation of potassium fluoride from potassium sulfate. In a specific embodiment of the present invention technical grade potassium carbonate is prepared from agricultural grade potassium sulfate.

Potassium sulfate is produced in large amounts from langbeinite ore, such as the langbeinite ore mined in the vicinity of Carlsbad, New Mexico, U.S.A. Potassium sulfate is also produced from natural brines. A major portion of the potassium sulfate production is used for agricultural purposes. Some potassium sulfate is also used as a raw material for the chemical and process industries. The potassium sulfate produced from langbeninite ores is usually of so-called agricultural grade and contains about 92% potassium sulfate, the remainder being sodium sulfate, potassium chlorides, magnesium salts, and other impurities.

It is preferable that a process for the production potassium chemicals from potassium sulfate be able to use agricultural grade potassium sulfate because of its ready availability and low cost. The process of the present invention is capable of producing substantially pure or technical grade potassium compounds from agricultural grade potassium sulfate.

The process of the present invention produces a high grade potassium fluoride which is suitable as a raw material for various chemical and process industries, for example in organic syntheses for the production of organofluorine compounds. Both the anhydrous salt and the dihydrate are used in preparing solder fluxes.

In an embodiment of the present invention, the potassium fluoride produced is used to prepare substantially pure or technical grade potassium carbonate. Potassium carbonate finds extensive use in the production of soaps and chemicals, and in glass manufacture it is a preferred source of potash.

Accordingly, it is an object of the present invention to provide a process for the production of potassium compounds from potassium sulfate.

It is another object of the present invention to provide a process for the production of potassium fluoride from potassium sulfate.

It is a further object to provide a process for the production of technical grade potassium carbonate from agricultural grade potassium sulfate.

These and other objects and advantages of the present invention will be apparent as the description of the present invention progresses.

It has now been discovered that potassium fluoride can be prepared by heating an admixture of potassium fluosilicate, potassium sulfate and carbonaceous material at a temperature above about 1200° F. The resultant reaction mass is cooled and the potassium fluoride in the resultant solid material may be recovered in any suitable manner. In a further embodiment of this invention, the resultant solid material is treated with calcium carbonate and water, thereby producing an aqueous solution of potassium carbonate and a solid precipitate containing calcium fluoride and silica. The solution may be separated from the solids by any suitable method and the separated solution may be evaporated to produce high purity potassium carbonate.

The solid precipitate contains calcium fluoride and silica. The fluorine values in this precipitate may be recovered by treating the precipitate with a sulfuric acid solution to form a solution of fluosilicic acid and a calcium sulfate precipitate. The fluosilicic acid solution may be separated from the solid calcium sulfate in any suitable manner such as by filtration, centrifugation, etc.

The fluosilicic acid may be recovered as such; however, it is preferable to add potassium sulfate to the fluosilicic acid solution to produce a precipitate of potassium fluosilicate and sulfuric acid. The sulfuric acid solution may be separated from the solid potassium fluosilicate in any suitable manner. The potassium fluosilicate may be recycled to the first step of the process wherein potassium fluoride is produced and the sulfuric acid may be recycled in the process to treat the precipitate of calcium fluoride and silica.

The potassium sulfate starting material is preferably at least of the agricultural grade having a minimum $K_2SO_4$ content of about 92% by weight. Potassium sulfate starting material of higher purity may, of course, be used, and starting material of lower purity may also be used. It is also within the scope of this invention to use substantially pure $K_2SO_4$ as a starting material. It is preferred to use a potassium sulfate material containing a low proportion of iron impurities, for example less than 1% $Fe_2O_3$, since large proportions of iron impurities are usually undesirable when the potassium product is used in the ceramic or glass industries.

In accordance with the present invention, the potassium sulfate-containing starting material, potassium fluosilicate ($K_2SiF_6$), and carbonaceous material, are intimately mixed prior to the heat-treating. Sufficient potassium fluosilicate is added to the mixture to give a mole ratio of $K_2SiF_6$ to $K_2SO_4$ of at least 1:4 and more preferably a mole ratio of at least 1:2.5. The mole ratio is preferably within the range between about 1:2.5 and about 1:1. Lesser amounts of potassium fluosilicate result in less conversion to potassium fluoride, whereas greater amounts of the potassium fluosilicate do not appreciably increase the yield of potassium fluoride and result in a loss of fluorine values. Amounts greater than necessary to achieve optimum results are, of course, economically less desirable.

Carbonaceous material is present in the admixture. It is believed that the carbonaceous material effects conversion of the potassium sulfate to the basic compound potassium sulfide during the heat treating step. Any suitable carbonaceous material which is capable of reducing the potassium sulfate to potassium sulfide may be used. Typical carbonaceous materials are coal, petroleum cake, vegetable carbon, carbon black, etc., and mixtures thereof. The carbonaceous material should preferably be substantially free of iron and other substances which may tend to discolor the resulting product. The mole ratio of potassium sulfate to carbonaceous material appears to play an important role in the recovery of potassium values in the product. Sufficient carbonaceous material is added to the mixture to provide a mole ratio of potassium sulfate to carbonaceous material of at least 1:1 and preferably of from about 1:1.4 to about 1:5 and more preferably from about 1:1.4 to about 1:1.6.

It is important that the potassium fluosilicate, potassium sulfate, and carbonaceous material be in intimate contact during the heating step. For this reason, the reactants should be in finely divided form, and substantially all of the particles should pass a 60 mesh screen (ASTM designation), and preferably a 100 mesh screen. Coarser particles have a relatively low ratio of surface area to unit weight; and because of the lesser proportions of surface area available for contact, complete reaction of such particles is not as readily attained. Since particles in a finely divided condition may be carried out of the furnace in the exhaust gases prior to reaction, the reactants, in finely divided form, may be admixed with a small amount of water and pelletized or briquetted or the like, or granulated by tumbling, etc. A pellet size of about one-half inch in average diameter is suitable; however, larger or smaller size pellets may be used when desired.

The reactants are admixed in a suitable blending apparatus, such as a pug mill, and the resulting mixture, either with or without pelletizing, briquetting, granulating, etc., as the case may be, is then conveyed to a suitable heating apparatus, such as an oil-fired rotary kiln. The reactants are heated to a temperature above about 1200° F., preferably to a temperature within the range of from about 1200° F. to about 1650° F. and more preferably to a temperature within the range of from about 1400° F. to about 1600° F. Temperatures below about 1200° F. are generally too low to accomplish any significant reaction. Temperatures above about 1650° F. usually show a decrease in conversion of the potassium sulfate to potassium fluoride. The heating is conducted in a non-oxidizing atmosphere to prevent the oxidation of the carbon with oxygen gas. The atmosphere is preferably a reducing atmosphere. The non-oxidizing atmosphere may be provided by a suitable gas such as, for example, hydrogen, nitrogen, carbon dioxide, etc.

The reactants are heated at the elevated temperature for at least five minutes, and preferably between about fifteen minutes and about four hours, the time generally varying inversely with the temperature of heating. Carbon dioxide gas is evolved during the reaction and sulfur is also volatilized during the reaction. These may be recovered when desired. After about four hours, there usually is little or no further reaction, and accordingly heating periods in excess of around four hours are not economical. The reaction may generally be illustrated by the following equation:

$$K_2SiF_6 + 2K_2SO_4 + 3C \rightarrow 6KF + SiO_2 + 3CO_2\uparrow + 2S\uparrow$$

After the reactants have been heated in the above-described manner, the resultant solid material is cooled in any suitable manner such as in an air cooler or by quenching in an aqueous medium. The solid material discharged from the kiln contains potassium fluoride and silica. The potassium fluoride may be separated from the silica by leaching the solids with water or other aqueous medium, thereby dissolving the potassium fluoride. When the kiln discharge is water quenched, a solution of potassium fluoride will result directly. The solution of potassium fluoride may readily be separated from the silica by filtration, centrifugal separation, or other means. When desired, the potassium fluoride may be recovered from solution by evaporation, crystallization, or other suitable means.

The heated reactants are, however, preferably quenched in water or a weak fluosilicic acid solution having a $H_2SiF_6$ concentration between about 0.1% and 5%, and the resultant slurry, containing dissolved potassium fluoride and solid silica, is reacted with calcium carbonate to form a solution of potassium carbonate containing solid calcium fluoride and silica. This reaction may generally be illustrated by the following formula:

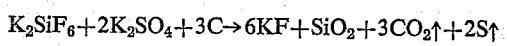
$$6KF + 2CaCO_3 + SiO_2 \xrightarrow{H_2O} 3K_2CO_3 + 3CaF_2 + SiO_2$$

It is preferable to use at least the stoichiometric amount of calcium carbonate necessary to convert all of the potassium fluoride to potassium carbonate. This reaction is suitably conducted at a temperature above about 150° F. and preferably at a temperature within the range of about 160° F. to about 200° F.

The solution of potassium carbonate is separated from the calcium fluoride and silica in any suitable manner, such as by filtration, centrifugal separation, or the like. Potassium carbonate may be recovered as a solid by evaporating the solution, crystallization, or other suitable techniques. The potassium carbonate resulting from this process will be of high purity. When agricultural grade potassium sulfate is used as a starting material, the potassium carbonate generally is at least of so-called technical grade containing at least 99.0% $K_2CO_3$.

The calcium fluoride and silica solids are preferably reacted with at least the stoichiometric amount of sulfuric acid according to the equation:

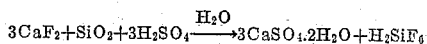
$$3CaF_2 + SiO_2 + 3H_2SO_4 \xrightarrow{H_2O} 3CaSO_4 \cdot 2H_2O + H_2SiF_6$$

The calcium sulfate hydrate is a solid and may be separated from the fluosilicic acid solution in any suitable manner. The reaction occurs at ambient temperature, that is, generally within the range from about 50° F. to about 100° F.

The fluosilicic acid solution is preferably reacted with at least the stoichiometric amount of potassium sulfate according to the equation:

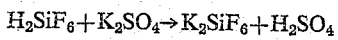
$$H_2SiF_6 + K_2SO_4 \rightarrow K_2SiF_6 + H_2SO_4$$

to produce solid potassium fluosilicate which can be separated by any suitable means from the sulfuric acid and may be recycled to the first step of the process and the sulfuric acid may be recycled within the process for reaction with the calcium fluoride and silica. The reaction occurs at ambient temperature, that is, generally within the range of from about 50° F. to about 100° F.

Having generally described the process of the invention, a more specific and detailed description will be given with reference to the accompanying drawing which is a flowsheet illustrating the general application of the process of the invention. The flowsheet is intended merely as an illustration and not as a limitation of the instant invention. Modifications of the process illustrated in the drawing, while employing the principles of the instant invention, will be apparent to those skilled in the art.

Referring to the drawing, a charge of 180 lbs. of carbon and 1,840 lbs. of potassium sulfate introduced through line 7 are intimately mixed with 1,210 lbs. of potassium fluosilicate introduced through line 9 in a pug mill 11. The mixture is passed from the pug mill through line 13 into a tank-type hearth furnace 15 wherein the mixture is heated at 1520° F. for 1½ hours. During the reaction, sulfur vaporizes and is withdrawn from the furnace through line 17 and is introduced into water scrubber and filter 19. The hot reaction mixture is withdrawn from the furnace through line 21 and is quenched in a 2% fluosilicic acid solution in zone 23, thereby forming a solution containing potassium fluoride and solid silica.

Referring back to the water scrubber and filter 19, water is introduced into the water scrubber through line 25 and a sulfur cake is withdrawn through line 27. Approximately 2,000 pounds of solution is withdrawn through line 29 and is passed into zone 23 for the quenching operation.

About 3,655 pounds of solution and 310 pounds of solids are withdrawn from the quench zone 23 through line 31 and are introduced into precipitation zone 33. About 1,670 pounds of finely ground calcium carbonate are also introduced into precipitation zone 33 through line 35. The materials in zone 33 are agitated at a temperature of about 185° F. for four hours, during which time a precipitate of calcium fluoride and an aqueous solution of potassium carbonate are formed. The silica introduced through line 31 still remains as such in zone 33. The reaction mass in zone 33 is withdrawn through line 37 and introduced into a cooler-filter 39 wherein the solution is cooled to about 85° F. and the material is filtered. Approximately 3,785 pounds of potassium carbonate solution is withdrawn through line 41 and introduced into an evaporator crystallizer 43. In the evaporator crystallizer water is evaporated, and approximately 1,785 pounds of water are removed through line 45. The potassium carbonate crystals and mother liquor are withdrawn from the evaporator crystallizer through line 47 and introduced to a filter 49. The filter separates the crystals from the mother liquor. The mother liquor is recycled through line 51 to the evaporator crystallizer 43 and the crystals are withdrawn through line 53 and introduced into dryer 55 wherein the crystals are dried at a temperature of about 300° F. Approximately 2,000 pounds of dried $K_2CO_3$ are produced and withdrawn through line 57 as a product of the process.

The solids in cooler-filter 39 are removed from the filter and introduced through line 59 into reactor 61 wherein the calcium fluoride and silica are reacted with sulfuric acid introduced into reactor 61 through line 63. The sulfuric acid in reactor 63 consists of 995 pounds of 96% $H_2SO_4$ introduced through line 65, and 2,352 pounds of 20% sulfuric acid recycled through line 67. The production of the recycle $H_2SO_4$ is hereinafter described. In the reactor 61 the calcium fluoride and silica and sulfuric acid react to produce a precipitate of calcium sulfate and a solution of fluosilicic acid. The product is withdrawn from reactor 61 through line 69 and is introduced to a filter 71. The filter separates the solid calcium sulfate, which is removed through line 73, from the fluosilicic acid, which is removed through line 75 and introduced into reactor 77. Into reactor 77 are also introduced 920 pounds of $K_2SO_4$ through line 79 and 80 pounds of $H_2SiF_6$ through line 81. In the reactor the fluosilicic acid and potassium sulfate react to produce solid potassium fluosilicate ($K_2SiF_6$) and sulfuric acid. These are withdrawn from reactor 77 through line 83 and introduced to a filter 85 which separates the potassium fluosilicate from the sulfuric acid. The sulfuric acid is withdrawn from the filter 85 and recycled to reactor 61 through line 67. The potassium fluosilicate is withdrawn through line 9 and is recycled to the pug mill 11.

In order to give a clearer understanding of the invention, but with no intention to be limited thereto, the following specific examples are given:

EXAMPLE I

A reaction mixture was prepared by intimately mixing together 0.102 mole $K_2SO_4$, 0.05 mole $K_2SiF_6$, and 0.15 mole of vegetable carbon. All of the reactants were in finely divided form. The reaction mixture was placed in a tube furnace and a $CO_2$ atmosphere maintained by passing $CO_2$ gas over the mixture at a velocity of about 85 cm./min. The mixture was heated at 1382° F.±18° for one hour. The product was slowly cooled, removed from the tube and analyzed for $K_2O$, F, and $SO_4$ content. This test was repeated at a series of different reaction temperatures to study the effect of temperature on the reaction. The results of the tests are tabulated below in Table 1:

Table 1

| Test No. | Reaction Temperature ±18° F. | Product Analysis | | |
|---|---|---|---|---|
| | | Percent $K_2O$ | Percent F | Percent $SO_4$ |
| 1 | 1,382° F. | 56.0 | 20.0 | 20.1 |
| 2 | 1,472° F. | 62.3 | 21.8 | 11.7 |
| 3 | 1,562° F. | 60.9 | 21.9 | 10.6 |
| 4 | 1,652° F. | 61.4 | 20.3 | 15.4 |

EXAMPLE II

A second series of tests was conducted substantially as described in Example I. In this series the temperature of the reaction was maintained constant at 1472° F.±18° F. and the mole ratio of the reactants was varied. The results of the tests are tabulated below in Table 2:

Table 2

| Test No. | Moles of Reactants | | | Percent of Feed Values Recovered in the Product | | |
|---|---|---|---|---|---|---|
| | $K_2SiF_6$ | $K_2SO_4$ | Carbon | $K_2O$ | F | $SO_4$ |
| 5 | 0.060 | 0.102 | 0.102 | 100 | 84 | 28 |
| 6 | 0.060 | 0.102 | 0.127 | 96 | 81 | 20 |
| 7 | 0.055 | 0.102 | 0.152 | 92 | 83 | 21 |
| 8 | 0.050 | 0.102 | 0.102 | 100 | 86 | 86 |

EXAMPLE III

A third series of tests was conducted substantially at the same conditions as of Test 2 of Example I. During this series of tests the inert atmosphere was maintained with $CO_2$ in one test and with $N_2$ in another test. No significant effect on the reaction was noted when the gas was changed. The gas velocities were also varied from 1.0 to 274 cm./min. and again no significant effect was noted.

EXAMPLE IV

A fourth series of tests was conducted substantially as described in Example I. The amount of vegetable carbon used was varied to study the effect of the mole ratio in respect to carbon. In this series of tests the reactor temperature was maintained constant at 1472° F.±18° F. The results of these tests are tabulated below in Table 4.

Table 4

| Test No. | Mole Ratio | | Percent Feed Values Recovered in the Product | |
|---|---|---|---|---|
| | $K_2SO_4/K_2SiF_6$ | $C/K_2SO_4$ | $SO_4$ | F |
| 9 | 0.100/0.05 | 0.5 | 49 | 81 |
| 10 | 0.100/0.05 | 1.0 | 31 | 79 |
| 11 | 0.110/0.05 | 1.0 | 26 | 84 |
| 12 | 0.102/0.05 | 1.0 | 28 | 84 |
| 13 | 0.102/0.05 | 1.25 | 25 | 84 |

EXAMPLE V

A sample of 72.9 grams in weight was composited from tests of Example IV. A sample of oolitic limestone was ground to pass 150 mesh screen and used for this test. The limestone at 102% of theoretical weight based on the calculated fluorine content was reacted with the composite sample at 185° F. for four hours. Water was present in the reaction mixture in a quantity to give a 5 N fluoride solution. The resultant solution was filtered and the filtrate was evaporated to fractionally crystallize out some potassium impurities. The remaining filtrate was analyzed for $K_2O$, F, $SO_4$, and $CO_2$, and the analysis indicated that the filtrate was a high purity potassium carbonate solution.

The invention, as illustrated by the foregoing examples, affords an efficient and economical method for the production of potassium compounds from potassium sulfate. The invention accordingly represents a significant contribution to the art.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the inven- tion, what is desired to be secured and claimed by Letters Patent is set forth in the appended claims.

I claim:
1. A process for the preparation of potassium fluoride which comprises heating a finely divided admixture of potassium fluosilicate, potassium sulfate, and carbonaceous material in a non-oxidizing atmosphere, at a temperature of at least 1200° F.

2. A process for the preparation of potassium fluoride which comprises heating a finely divided admixture of potassium fluosilicate, potassium sulfate, and carbonaceous material in a non-oxidizing atmosphere, at a temperature within the range of about 1200° F. to about 1650° F.

3. A process for the preparation of potassium carbonate which comprises heating a finely divided admixture of potassium fluosilicate, potassium sulfate, and carbonaceous material in a non-oxidizing atmosphere, at a temperature of at least 1200° F., and treating the resultant reaction mass with calcium carbonate in aqueous solution, thereby producing an aqueous solution of potassium carbonate and a solid precipitate containing calcium fluoride and silica.

4. A process for the preparation of potassium fluoride which comprises heating a finely divided admixture of potassium fluosilicate, potassium sulfate, and carbonaceous material, the amount of potassium fluosilicate in said admixture being sufficient to give a mole ratio of $$K_2SiF_6/K_2SO_4$$

of at least 1:4, at a temperature of at least 1200° F., in a non-oxidizing atmosphere.

5. A process for the preparation of potassium fluoride which comprises heating a finely divided admixture of potassium fluosilicate, potassium sulfate, and carbonaceous material, the amount of potassium fluosilicate in said admixture being sufficient to give a mole ratio of $$K_2SiF_6/K_2SO_4$$

of at least 1:2.5, at a temperature of at least 1200° F., in a non-oxidizing atmosphere.

6. A process for the preparation of potassium fluoride which comprises heating a finely divided admixture of potassium fluosilicate, potassium sulfate, and carbonaceous material, the amount of potassium fluosilicate in said admixture being sufficient to give a mole ratio of $$K_2SiF_6/K_2SO_4$$

within the range of about 1:2.5 to about 1:1, at a temperature of at least 1200° F., in a non-oxidizing atmosphere.

7. A process for the preparation of potassium fluoride which comprises heating a finely divided admixture of potassium fluosilicate, potassium sulfate, and carbonaceous material, said carbonaceous material being present in an amount sufficient to give a mole ratio of $K_2SO_4/C$ of at least 1:1, at a temperature within the range of about 1200° F. to about 1650° F., in a non-oxidizing atmosphere.

8. A process for the preparation of potassium fluoride which comprises heating a finely divided admixture of potassium fluosilicate, potassium sulfate, and carbonaceous material, said carbonaceous material being present in an amount sufficient to give a mole ratio of $K_2SO_4/C$ within the range from about 1:1.4 to about 1:1.6, at a temperature within the range from about 1200° F. to about 1650° F., in a non-oxidizing atmosphere.

9. A process for the preparation of potassium fluoride which comprises heating a finely divided admixture of potassium fluosilicate, potassium sulfate, and carbonaceous material, said carbonaceous material being present in an amount sufficient to give a mole ratio of $K_2SO_4/C$ within the range from about 1:1.4 to about 1:5, at a temperature within the range of from about 1200° F. to about 1650° F., in a non-oxidizing atmosphere.

10. A process for the preparation of potassium carbonate which comprises heating a finely divided admixture of potassium fluosilicate, potassium sulfate, and carbonaceous material at a temperature within the range of from about 1200 F. to about 1650° F., in a non-oxidizing atmosphere, for at least five minutes, reacting the resulting reaction mass with calcium carbonate in aqueous solution at a temperature within the range of from about 160° F. to about 220° F. to produce an aqueous solution of potassium carbonate and a solid precipitate containing calcium fluoride and silica, said calcium carbonate being present in at least the stoichiometric amount necessary to convert all of the potassium fluoride in said reaction mass to potassium carbonate.

11. A process for the preparation of potassium carbonate which comprises heating a finely divided admixture of potassium fluosilicate, potassium sulfate, and carbonaceous material at a temperature within the range of from about 1200° F. to about 1650° F., in a non-oxidizing atmosphere, for at least five minutes, reacting the resulting reaction mass with calcium carbonate in aqueous solution at a temperature within the range of about 160° F. to about 220° F. to produce an aqueous solution of potassium carbonate and a solid precipitate containing calcium fluoride and silica, said calcium carbonate being present in at least the stoichiometric amount necessary to convert all of the potassium fluoride in said reaction mass to potassium carbonate, separating said solid precipitate from said aqueous potassium carbonate solution, reacting said precipitate with sulfuric acid to produce a precipitate of calcium sulfate and an aqueous solution of fluosilicic acid, said sulfuric acid being present in at least the stoichiometric amount necessary to convert all of the calcium fluoride and silica in said solid precipitate to calcium sulfate and fluosilicic acid, separating said solid calcium sulfate from said fluosilicic acid solution, and reacting said fluosilicic acid solution with potassium sulfate to form potassium fluosilicate and an aqueous solution of sulfuric acid, said potassium sulfate being used in at least the stoichiometric amount.

References Cited in the file of this patent
UNITED STATES PATENTS

| 1,581,819 | Siegel | Apr. 20, 1926 |
| 2,354,177 | Kawecki | July 18, 1944 |

FOREIGN PATENTS

| 541,607 | Canada | May 28, 1957 |

UNITED STATES PATENT OFFICE
CERTIFICATE OF CORRECTION

Patent No. 2,980,504        April 18, 1961

Arthur N. Baumann

It is hereby certified that error appears in the above numbered patent requiring correction and that the said Letters Patent should read as corrected below.

Column 1, line 32, after "potassium" insert -- and sodium --; column 3, line 72, the left-hand portion of the formula, for "$6KF+2CaCO_3+SiO_2$" read -- $6KF+3CaCO_3+SiO_2$ --; column 6, Table 2, column 7, line 4 thereof, for "86" read -- 26 --.

Signed and sealed this 21st day of August 1962.

(SEAL)
Attest:

ESTON G. JOHNSON        DAVID L. LADD
Attesting Officer         Commissioner of Patents